United States Patent
Hung et al.

(10) Patent No.: US 11,290,011 B2
(45) Date of Patent: Mar. 29, 2022

(54) POWER CONVERSION APPARATUS AND CONTROL CIRCUIT AND CONTROL METHOD THEREOF CAPABLE OF ENSURING LOAD SWITCH TO OPERATE WITHIN SAFETY OPERATION AREA DURING OVER-CURRENT PROTECTION TEST

(71) Applicant: RICHTEK TECHNOLOGY CORPORATION, Zhubei (TW)

(72) Inventors: Yu-Lung Hung, Taoyuan (TW); Hsing-Shen Huang, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 79 days.

(21) Appl. No.: 16/884,024

(22) Filed: May 26, 2020

(65) Prior Publication Data

US 2021/0126529 A1  Apr. 29, 2021

Related U.S. Application Data

(60) Provisional application No. 62/925,711, filed on Oct. 24, 2019.

(30) Foreign Application Priority Data

Feb. 25, 2020 (TW) .................. 109106115

(51) Int. Cl.
*H02M 3/156* (2006.01)
*H02M 1/08* (2006.01)

(52) U.S. Cl.
CPC .............. *H02M 3/156* (2013.01); *H02M 1/08* (2013.01)

(58) Field of Classification Search
None
See application file for complete search history.

(56) References Cited

U.S. PATENT DOCUMENTS

| 7,068,485 | B2 * | 6/2006 | Ishikawa ............... H02M 3/156 |
| | | | 361/93.9 |
| 8,178,996 | B2 * | 5/2012 | Kuno .................... H02M 3/158 |
| | | | 307/28 |
| 9,065,435 | B1 | 6/2015 | McDonald et al. |
| 9,350,180 | B2 | 5/2016 | Maxwell et al. |
| 9,484,800 | B2 * | 11/2016 | Faingersh ............... H02M 1/36 |
| 9,791,916 | B2 * | 10/2017 | Lee ........................... G06F 1/26 |

* cited by examiner

*Primary Examiner* — Jeffrey A Gblende
(74) *Attorney, Agent, or Firm* — Tung & Associates (57) ABSTRACT

A power conversion apparatus includes: a power supply circuit, a load switch and a control circuit. The power supply circuit generates a first power. The load switch controls the power path from the power supply circuit to a load. The control circuit generates a switching control signal to control a conduction level of the load switch according to an enable signal. The control circuit controls a level of the switching control signal to soft start from a first level to a second level. During the soft start period, the switching control signal has plural waveform segments including a first waveform segment and a second waveform segment. A level variation speed of the first waveform segment is higher than a level variation speed of the second waveform segment. The first waveform segment level precedes the second waveform segment level.

15 Claims, 10 Drawing Sheets

POWER CONVERSION APPARATUS AND CONTROL CIRCUIT AND CONTROL METHOD THEREOF CAPABLE OF ENSURING LOAD SWITCH TO OPERATE WITHIN SAFETY OPERATION AREA DURING OVER-CURRENT PROTECTION TEST

CROSS REFERENCE

The present invention claims priority to U.S. 62/925,711 filed on Oct. 24, 2019 and claims priority to TW 109106115 filed on Feb. 25, 2020.

BACKGROUND OF THE INVENTION

Field of Invention

The present invention relates to a power conversion apparatus; particularly, it relates to such power conversion apparatus capable of ensuring different switches having different characteristics to operate within a safety operation area under an over-current protection test performed on the switches. The present invention also relates to a control circuit and a control method for use in such power conversion apparatus.

Description of Related Art

The following patents are related to the present invention: U.S. Pat. Nos. 9,791,916 B2, 9,350,180 B2 and 9,065,435 B1.

Figure 1A:
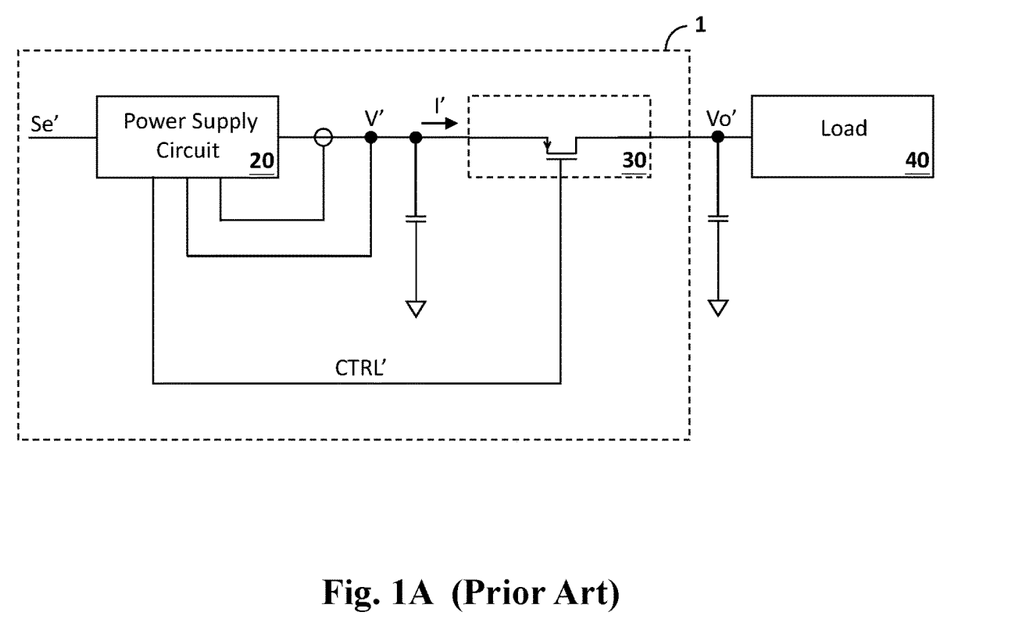
FIG. 1A shows a schematic diagram of a conventional power conversion apparatus.
Figure 1B:
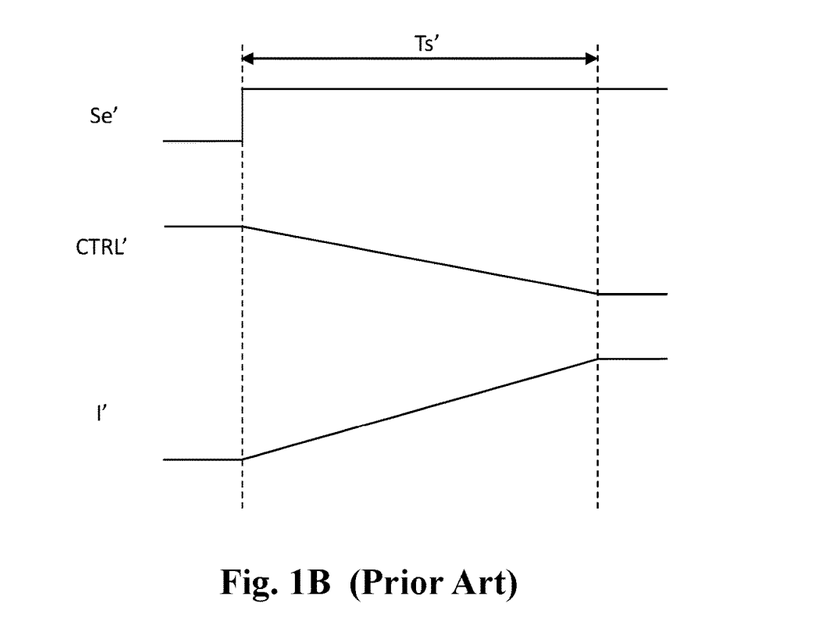
FIG. 1B shows operational waveforms in the conventional power conversion apparatus of FIG. 1A.

Please refer to FIG. 1A, which shows a schematic diagram of a conventional power conversion apparatus (i.e., power conversion apparatus 1). The power conversion apparatus 1 is configured to operably generate an output power Vo' which is supplied to a load 40. The power conversion apparatus 1 comprises: a power supply circuit 20 and a load switch 30 (which is a PMOS transistor). The power supply circuit 20 is configured to operably generate a power V'; the power supply circuit 20 generates a switching control signal CTRL' according to an enable signal Se', to control the conduction level of the load switch 30. The power supply circuit 20 further detects a current I' of the power V'; when the current I' is too high, the power supply circuit 20 turns OFF the load switch 30, to achieve over current protection. Please refer to FIG. 1B, which shows operational waveforms of the conventional power conversion apparatus of FIG. 1A. During a soft-start period Ts', the level of the switching control signal CTRL' is controlled to soft start from a first level to a second level. When the switching control signal CTRL' is at the first level, the load switch 30 is OFF; when the switching control signal CTRL' is at the second level, the load switch 30 is ON; when the switching control signal CTRL' transits from the first level to the second level, the load switch 30 gradually increases its conduction level, which is "soft-start". The current I' flowing through the load switch 30 is controlled to soft start from a low level to a high level.

Figure 1C:
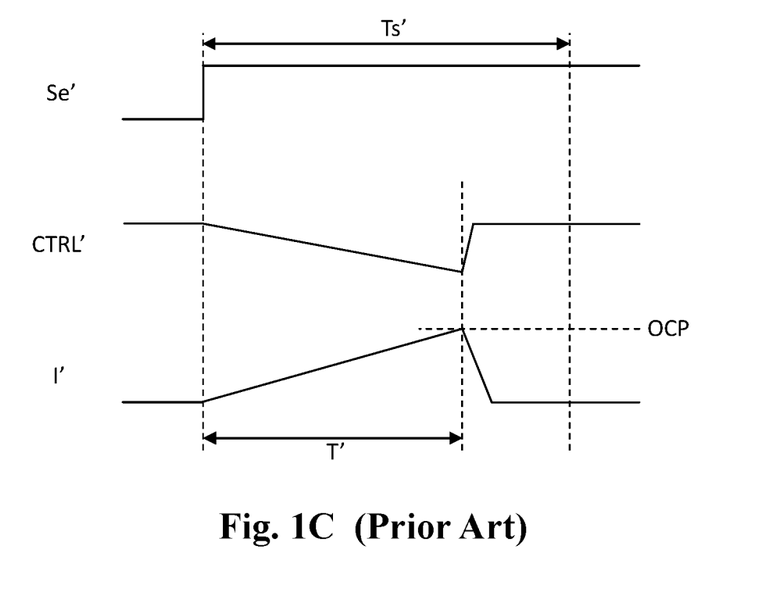
FIG. 1C shows operational waveforms when the conventional power conversion apparatus of FIG. 1A is under an over-current protection test.
Figure 2:
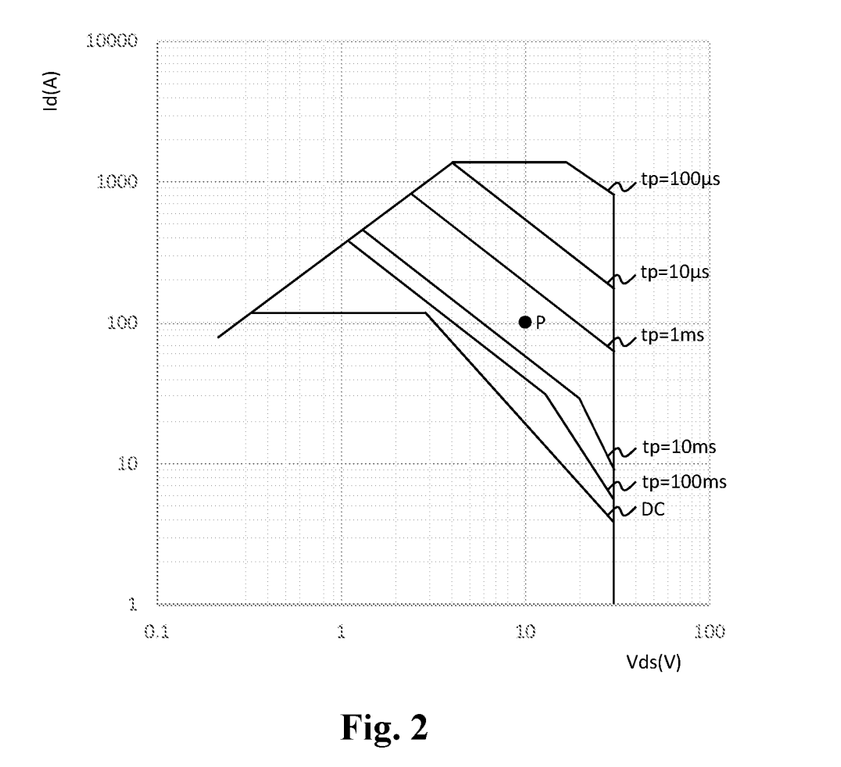
FIG. 2 is a graph showing the safety operation area of a load switch.

Please refer to FIG. 1C, which shows operational waveforms when the conventional power conversion apparatus of FIG. 1A is under an over-current protection test. As shown in FIG. 1C, during the soft-start period Ts', when the current I' reaches an over current protection level (as shown by the level OCP in FIG. 1C), the switching control signal CTRL' is switched to the first level to turn OFF the load switch 30. Please refer to FIG. 2, which is a graph showing the safety operation area of a load switch. A point in FIG. 2 corresponds to an operation point represented by the relationship of the drain-source voltage Vds and the drain current Id when the load switch 30 is ON. The safety operation area of the load switch 30 is the area within the lines. When the load switch 30 operates at operation points outside the lines, the load switch 30 may be damaged. When the ON period tp of the load switch 30 is shorter, the safety operation area for the load switch 30 is broader. For example, assuming that a point P is an operation point under an over-current protection test, when a level variation rate (an absolute value of the slope) of the current I' is smaller (referring to FIG. 1C, this means that it takes a longer period T' to reach the OCP level), the ON period tp of the load switch is longer (e.g., 10 ms); under such situation, the corresponding safety operation area is relatively smaller. In the shown example, the point P falls outside the safety operation area, and the load switch 30 may be damaged. In contrast, when a level variation rate of the current I' is faster (referring to FIG. 1C, this means that it takes a shorter period T' to reach the OCP level), the ON period tp of the load switch 30 is shorter (e.g., 1 ms); under such situation, the corresponding safety operation area is relatively larger. In the shown example, the point P falls within the safety operation area, and the load switch 30 can operate normally.

The prior art shown in FIG. 1A has the following drawbacks that: if the power conversion apparatus 1 does not employ a load switch 30 complying with a predefined specification, when an over-current protection test is performed, the load switch 30 is often damaged because the operation points under the over-current protection test can easily fall outside the safety operation area, i.e., the level variation rate of the current I' is small and the ON period tp of the load switch 30 is long to lead to a small safety operation area. In addition, the characteristics of the load switch 30 or the characteristics of other device (e.g., a capacitor) may affect the scope of the safety operation area or the locations of the operation points. In short, when an over-current protection test is performed and a load switch 30 which does not comply with the predefined specification is used, there will be a high likelihood that the load switch 30 is damaged because the load switch 30 does not operate within the safety operation area.

As compared to the prior art in FIG. 1, the present invention is advantageous in that: under an over-current protection test, if the power conversion apparatus of the present invention employs a load switch (or other devices) which does not comply with a predefined specification, the load switch (or other devices) can still operate within the safety operation area without being damaged, which provides a greater flexibility.

SUMMARY OF THE INVENTION

From one perspective, the present invention provides a power conversion apparatus, which is configured to operably generate an output power which is configured to be supplied to a load; the power conversion apparatus comprising: a power supply circuit, which is configured to operably generate a first power; a load switch coupled between the first power and the output power, the load switch being configured to operably control a power path from the power supply circuit to the load; and a control circuit, which is configured to operably generate a switching control signal according to an enable signal, to control a conduction level of the load switch, wherein a level of the switching control signal is controlled to soft start from a first level to a second level, wherein when the level of the switching control signal is the first level, the load switch is controlled to be OFF, and when the level of the switching control signal is the second level, the load switch is controlled to be ON; wherein a soft-start period is defined as a period in which the level of the switching control signal transits from the first level and the second level switch, and wherein during the soft-start period, the conduction level of the load switch is gradually increased; wherein during the soft-start period, the switching control signal has a plurality of waveform segments, wherein the plurality of waveform segments include a first waveform segment and a second waveform segment, wherein a level variation rate of the first waveform segment is higher than a level variation rate of the second waveform segment, and wherein the first waveform segment precedes the second waveform segment; wherein when a current of the first power exceeds an over-current threshold, the control circuit controls the load switch to be OFF.

In one embodiment, the load switch and the control circuit are located in different integrated circuits.

In one embodiment, the load switch is a PMOS transistor.

In one embodiment, the plurality of waveform segments are defined by a parameter which is stored in a random access memory (RAM) or a read only memory (ROM), or is determined according to an external input.

In one embodiment, the control circuit is configured as one of the following: (1) the control circuit including: a plurality of current sources; and at least one switch, which is configured to operably control the plurality of current sources, so that the switching control signal has the plurality of waveform segments during the soft-start period; (2) the control circuit including: a first capacitor; a first resistor coupled to the first capacitor, wherein the first resistor and the first capacitor form a first filter path; and a plurality of switches coupled between the first filter path and a voltage source having the second level, wherein each switch generates the switching control signal according to a corresponding upstream control signal, so that the switching control signal has the plurality of waveform segments during the soft-start period, wherein the corresponding upstream control signal is generated according to the enable signal; or (3) the control circuit including: a second capacitor; a second resistor coupled to the second capacitor, wherein the second resistor and the second capacitor form a second filter path; and a current source coupled between the second filter path and the voltage source having the second level, wherein the current source generates the switching control signal according to the enable signal, so that the switching control signal has the plurality of waveform segments during the soft-start period.

In one embodiment, when the control circuit is configured as (3), the plurality of waveform segments form a continuous waveform.

In one embodiment, in the plurality of waveform segments, a level variation rate of each waveform segment is a constant or a variable which is selectable, adjustable or adaptively automatically adjustable.

In one embodiment, the control circuit is configured to operably generate the switching control signal further according to a selection signal, wherein the selection signal is configured to operably determine whether the level variation rate of each waveform segment is adaptively automatically adjustable.

In one embodiment, the power conversion apparatus further comprises: a switch detection circuit coupled between the load switch and the control circuit, the switch detection circuit being configured to operably detect a characteristic parameter of the load switch; wherein when the level variation rate of each waveform segment is adaptively automatically adjustable, the control circuit adjusts the switching control signal according to the characteristic parameter, so that in the plurality of waveform segments of the switching control signal, the level variation rate of each waveform segment is adaptively automatically adjusted according to the characteristic parameter.

In one embodiment, the characteristic parameter is related to a parasitic capacitance of the load switch.

In one embodiment, the power supply circuit is further configured to operably convert a second power to the first power, wherein the power conversion apparatus further comprises a power detection circuit, which is coupled between the second power and the control circuit, wherein the power detection circuit is configured to operably detect a voltage and a current of the second power, to generate a detection signal; wherein when the level variation rate of each waveform segment is a variable which is adaptively automatically adjustable, the control circuit adjusts the switching control signal according to the detection signal, so that in the plurality of waveform segments of the switching control signal, the level variation rate of each waveform segment is adaptively automatically adjusted according to the detection signal.

From another perspective, the present invention provides a control circuit, which is configured to operably generate a switching control signal according to an enable signal, to control a conduction level of a load switch so as to control a power supply circuit to generate a first power for supplying power to a load, wherein a level of the switching control signal is controlled to soft start from a first level to a second level, wherein when the level of the switching control signal is the first level, the load switch is controlled to be OFF, and wherein when the level of the switching control signal is the second level, the load switch is controlled to be ON, wherein a soft-start period is defined as a period in which the level of the switching control signal transits from the first level and the second level switch, and wherein during the soft-start period, the conduction level of the load switch is gradually increased; the control circuit comprising one of the following configurations: (1) the control circuit comprising: a plurality of current sources; and at least one switch, which is configured to operably control the plurality of current sources, so that the switching control signal has a plurality of waveform segments during the soft-start period; (2) the control circuit comprising: a first capacitor; a first resistor coupled to the first capacitor, wherein the first resistor and the first capacitor form a first filter path; and a plurality of switches coupled between the first filter path and a voltage source having the second level, wherein each switch generates the switching control signal according to a corresponding upstream control signal, so that the switching control signal has a plurality of waveform segments during the soft-start period, wherein the corresponding upstream control signal is generated according to the enable signal; (3) the control circuit comprising: a second capacitor; a second resistor coupled to the second capacitor, wherein the second resistor and the second capacitor form a second filter path; and a current source coupled between the second filter path and a voltage source having the second level, wherein the current source generates the switching control signal according to the enable signal, so that the switching control signal has a plurality of waveform segments during the soft-start period; wherein during the soft-start period, the switching control signal has the plurality of waveform segments, wherein the plurality of waveform segments includes a first waveform segment and a second waveform segment, wherein a level variation rate of the first waveform segment is higher than a level variation rate of the second waveform segment, and wherein the first waveform segment precedes the second waveform segment; wherein when a current of the first power exceeds an over-current threshold, the control circuit controls the load switch to be OFF.

From yet another perspective, the present invention provides a control method for controlling a power conversion apparatus, the control method being configured to control a conduction level of a load switch of the power conversion apparatus, so as to control a power supply circuit of the power conversion apparatus to generate a first power for supplying power to a load; the control method comprising: generating a switching control signal according to an enable signal; and controlling a level of the switching control signal, to soft start from a first level to a second level, wherein a soft-start period is defined as a period in which the switching control signal transits from the first level to the second level; wherein: when the level of the switching control signal is the first level, controlling the load switch to be OFF; when the level of the switching control signal is the second level, controlling the load switch to be ON; when the level of the switching control signal transits from the first level to the second level, gradually increasing the conduction level of the load switch; wherein during the soft-start period, the switching control signal has a plurality of waveform segments, wherein the plurality of waveform segments includes a first waveform segment and a second waveform segment, wherein a level variation rate of the first waveform segment is higher than a level variation rate of the second waveform segment, and wherein the first waveform segment precedes the second waveform segment; wherein when a current of the first power exceeds an over-current threshold, the control circuit controls the load switch to be OFF.

In one embodiment, the control method further comprising: generating the switching control signal according to a selection signal; wherein the selection signal is configured to operably determine whether the level variation rate of each waveform segment is adaptively automatically adjustable.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 3A:
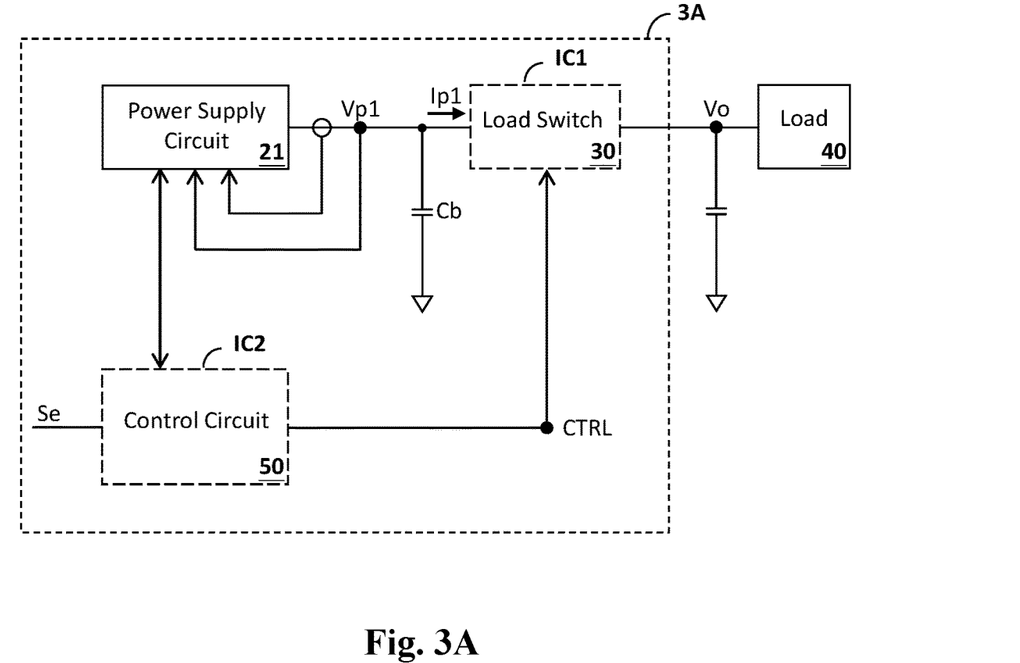
FIG. 3A shows a schematic block diagram of a power conversion apparatus according to an embodiment of the present invention.

Please refer to FIG. 3A, which shows a schematic block diagram of a power conversion apparatus (i.e., power conversion apparatus 3A) according to an embodiment of the present invention. In one embodiment, the power conversion apparatus 3A is configured to operably generate an output power Vo' which is supplied to a load 40. The power conversion apparatus 3A comprises: a power supply circuit 21, a load switch 30 and a control circuit 50.

In one embodiment, the power supply circuit 21 is configured to operably generate a first power having a voltage Vp1 and a current Ip1. In one embodiment, the load switch 30 is coupled between the first power and the output power Vo, for controlling the power path from the power supply circuit 21 to the load 40. In one embodiment, the control circuit 50 is configured to operably generate a switching control signal CTRL to control a conduction level of the load switch 30 according to an enable signal Se, wherein the load switch 30 can operate in its linear region (i.e. in partial conduction) or in fully conduction, and the conduction level of the load switch 30 determines the level of the current Ip1. In one embodiment, the load switch 30 and the control circuit 50 can be located in different integrated circuits (e.g. IC1 and IC2), if the load switch 30 is required to comply with a predefined specification or a certain specification.

Figure 3B:
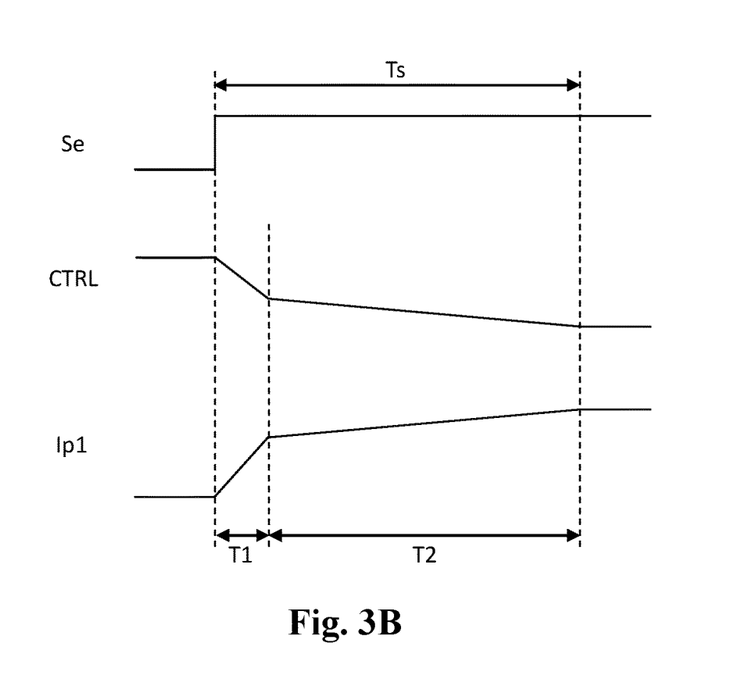
FIG. 3B shows operational waveforms in the power conversion apparatus of FIG. 3A.

Please refer to FIG. 3A in conjugation with FIG. 3B. FIG. 3B shows operational waveforms in the power conversion apparatus of FIG. 3A. In one embodiment, when the enable signal Se transits from a second level (e.g., the low level shown in FIG. 3B) to a first level (e.g., the high level shown in FIG. 3B), the control circuit 50 adjusts the level of the switching control signal CTRL, so that the level of the switching control signal CTRL soft starts the transition from a first level (e.g., the high level shown in FIG. 3B) to a second level (e.g., the low level shown in FIG. 3B). More specifically, in one embodiment as shown in FIG. 3B, the first level is high level and the second level is low level. In an embodiment arranged as thus, when the switching control signal CTRL is at high level, the load switch 30 is controlled to be OFF, and when the switching control signal CTRL is at low level, the load switch 30 is controlled to be ON; and, when the switching control signal CTRL is between the high level and the low level (i.e., as shown by the soft-start period Ts in FIG. 3B), the load switch 30 can operate in its linear region and the conduction level of the load switch 30 is gradually increased. In one embodiment, when the level of the switching control signal CTRL is controlled to soft start from high level to low level, the level of the current Ip1 flowing through the load switch 30 is controlled to soft start from low level to high level.

Please still refer to FIG. 3B. In one embodiment, during the soft-start period (i.e., as shown by the period Ts in FIG. 3B), the waveform of the switching control signal CTRL has plural waveform segments, including a first waveform segment and a second waveform segment. In the embodiment of FIG. 3B, the plural waveform segments are exactly two waveform segments. In this embodiment, the switching control signal CTRL has a first waveform segment during a period T1 and has a second waveform segment during a period T2. The current Ip1 has a corresponding first waveform segment during the period T1 and has a corresponding second waveform segment during the period T2. Note that in this embodiment, the period T1 precedes the period T2 and the period T1 is shorter than the period T2. Moreover, the level variation rate of the above-mentioned first waveform segment is higher than the level variation rate of the above-mentioned second waveform segment. That is, an absolute value of a slope of the first waveform segment is greater than an absolute value of a slope of the second waveform segment (i.e., the second waveform segment transits slower than the first waveform segment). Note that in other embodiments, the plural waveform segments can include more than two waveform segments. For example, another waveform segment can be included before the first waveform segment (i.e. before period T1) in FIG. 3B.

In one embodiment, the plural waveform segments are defined by a parameter which is stored in a random access memory (RAM) or a read only memory (ROM), or is determined according to an external input.

Please still refer to FIG. 3A. In one embodiment, as shown in FIG. 3A, the power supply circuit 21 is further configured to operably detect a current Ip1 of the first power; when the current Ip1 is too high (i.e., when the level of the current Ip1 of the first power exceeds a predetermined over-current threshold), the power supply circuit 21 informs the control circuit 50 to turn OFF the load switch 30, for over current protection. In one embodiment, the power supply circuit 21 is further configured to operably detect a voltage Vp1 of the first power; the power supply circuit 21 obtains the current Ip1 of the first power according to the voltage Vp1 of the first power and the characteristics of the load switch 30, so that when the current Ip1 is too high, the power supply circuit 21 can inform the control circuit 50 to turn OFF the load switch 30, for over current protection.

Figure 3C:
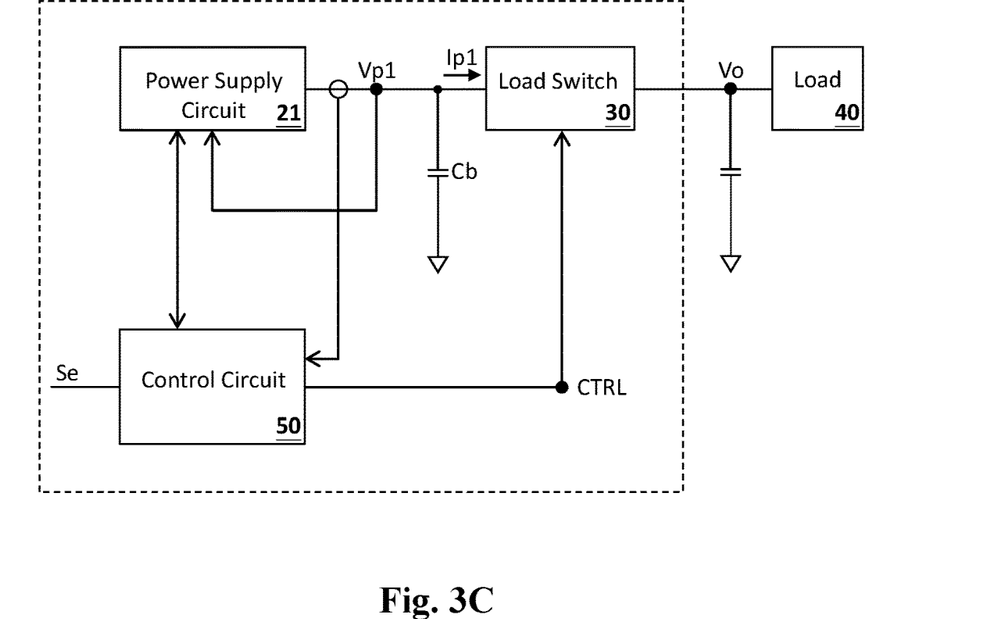
FIG. 3C shows a schematic block diagram of a power conversion apparatus according to an embodiment of the present invention.

Please refer to FIG. 3C, which shows a schematic block diagram of a power conversion apparatus (i.e., power conversion apparatus 3C) according to an embodiment of the present invention. In one embodiment, the control circuit 50 is further configured to operably detect a current Ip1 of the first power; when the current Ip1 is too high (i.e., when the level of the current Ip1 of the first power exceeds a predetermined over-current threshold), the control circuit 50 turns OFF the load switch 30, for over current protection. In other embodiments, the level of the current Ip1 of the first power can be detected by other circuits.

Figure 3D:
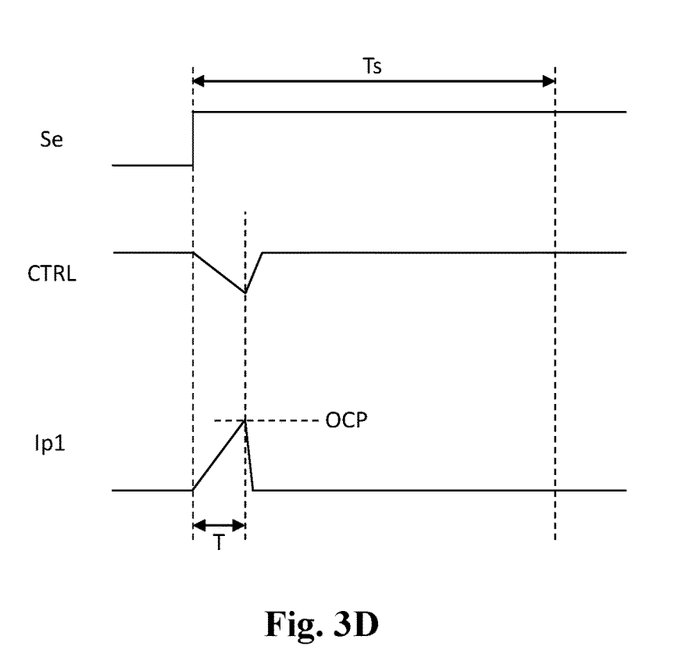
FIG. 3D shows operational waveforms when the power conversion apparatus of the present invention is under an over-current protection test.

Please refer to FIG. 3D along with FIG. 3A and FIG. 3B. FIG. 3D shows operational waveforms when the power conversion apparatus of the present invention is under an over-current protection test. As mentioned above, in one embodiment, an absolute value of a slope of the first waveform segment of the switching control signal CTRL and the current Ip1 is higher than an absolute value of a slope of the second waveform segment of the switching control signal CTRL and the current Ip1 (as shown in FIG. 3B). Hence, when the power conversion apparatus of the present invention is under an over-current protection test, as compared to the prior art in which the period for the current to reach an over-current level (i.e., as shown by the period T' in FIG. 1C) is relatively longer, the level variation rate of the first waveform segment of the present invention is relatively greater, which means that in the present invention, the period for the current Ip1 to reach an over-current level (i.e., over-current level OCP) is relatively shorter (referring to the period T in FIG. 3D); accordingly, the ON period of the load switch 30 is relatively shorter, whereby the safety operation area of the load switch 30 is relatively broader (referring to the description regarding FIG. 2: shorter ON period of the load switch corresponds to broader safety operation area). Consequently and desirably, according to the present invention, even if the load switch 30 does not comply with the predefined specification, the load switch 30 can still operate within the safety operation area when the power conversion apparatus of the present invention is under an over-current protection test, and the load switch 30 is not damaged.

Figure 4A:
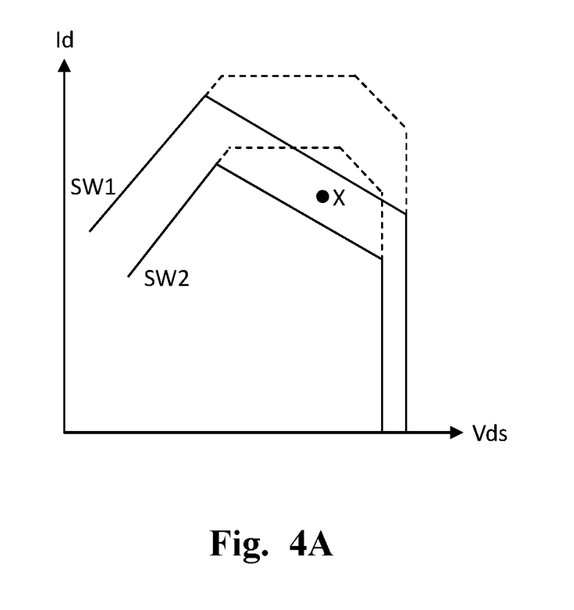
FIG. 4A is a graph showing different safety operation areas for two different load switches having different characteristics.

How the present invention is advantageous over the prior art will be explained by comparisons with respect to safety operation areas. Please refer to FIG. 4A, which is a graph showing different safety operation areas for two different load switches having different characteristics. As shown in FIG. 4A, a load switch SW1 and a load switch SW2 have different characteristics and different safety operation areas. The load switch SW1 is a switch complying with a predefined specification, while, the load switch SW2 is a switch complying with another specification. The solid lines indicate corresponding safety operation areas for the load switch SW1 and the load switch SW2 operating according to the prior art. In one embodiment, the point X is an operation point for an over-current protection test. In the prior art, when an over-current protection test is performed on the load switch SW1, the point X falls within the safety operation area; however, when the over-current protection test is performed on the load switch SW2, the point X falls outside the safety operation area, and the load switch SW2 may be damaged. According to the present invention, because the ON period is relatively shorter, the corresponding safety operation areas for the load switch SW1 and the load switch SW2 are expanded to the areas indicated by the dashed lines in FIG. 4A, respectively; thus, the point X not only falls within the safety operation area of the load switch SW1 but also falls within the safety operation area of the load switch SW2. That is to say, in the power conversion apparatus of the present invention, the load switch 30 can be a device which does not comply with a predefined specification, and under an over-current protection test, this device will not be damaged.

Figure 4B:
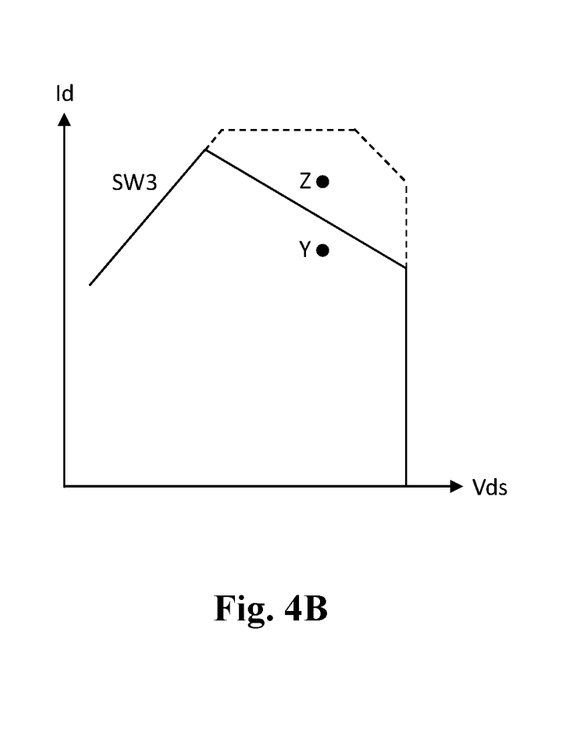
FIG. 4B is a graph showing different operation points corresponding to different capacitors having different characteristics.

Please refer to FIG. 4B, which is a graph showing different operation points corresponding to different capacitors having different characteristics. In the prior art, the safety operation area corresponding to a load switch SW3 is indicated by the solid line in FIG. 4B. Please refer to FIG. 3A along with FIG. 4B. When the capacitor Cb in FIG. 3A uses different capacitors having different characteristics, it could cause the over-current protection test to fail. More specifically, when the capacitor Cb uses a capacitor having a relatively smaller capacitance, under the over-current protection test, the operation point of the load switch SW3 for example may be the point Y shown in FIG. 4B, and when the capacitor Cb uses a capacitor having a relatively larger capacitance, under the over-current protection test, the operation point of the load switch SW3 for example may be the point Z shown in FIG. 4B. In the power conversion apparatus 1 of prior art shown in FIG. 1A, when the capacitor Cb uses a capacitor having a relatively smaller capacitance, the operation point Y falls within the safety operation area, but when the capacitor Cb uses a capacitor having a relatively greater capacitance, the operation point Z falls outside the safety operation area, which could damage the load switch SW3. According to the present invention, because the ON period for the load switch SW3 is shorter, the safety operation area of the load switch SW3 is expanded to an area indicated by the dashed line in FIG. 4B. Under such situation, regardless of whether the capacitor Cb uses a capacitor having a relatively larger capacitance or a capacitor having a relatively smaller capacitance, both the operation point Y and the operation point Z fall within the safety operation area. As a result, when an over-current protection test is performed on the power conversion apparatus 3A of the present invention, it is a less likely for the load switch 30 to be damaged due to different characteristics of the capacitor Cb.

Figure 5:
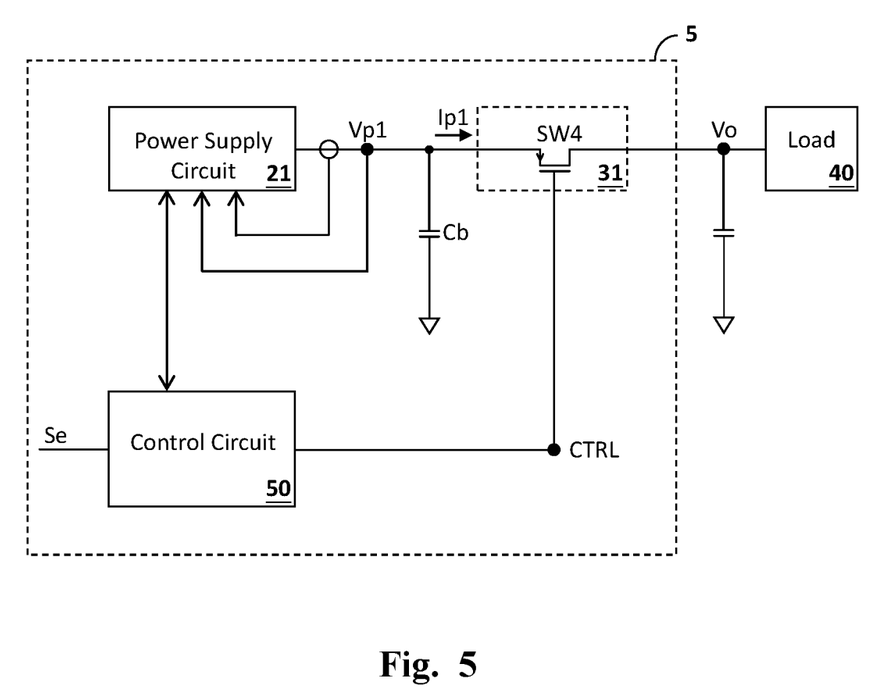
FIG. 5 shows a schematic diagram of a power conversion apparatus according to an embodiment of the present invention.

Please refer to FIG. 5, which shows a schematic diagram of a power conversion apparatus (i.e., power conversion apparatus 5) according to an embodiment of the present invention. In this embodiment, the power conversion apparatus 5 comprises: a power supply circuit 21, a load switch 31 and a control circuit 50. In one embodiment, the load switch 31 can be implemented as a PMOS transistor SW4 (in another embodiment, the load switch 31 can be implemented as an NMOS transistor). As shown in FIG. 5, the source of the load switch SW4 is coupled to the first power, the gate of the load switch SW4 is coupled to the control circuit 50 and the drain of the load switch SW4 is coupled to the load 40. In this embodiment, the gate-source voltage of the load switch 31 (i.e., the load switch SW4) corresponds to the switching control signal CTRL described in the abovementioned embodiment shown in FIG. 3A. This embodiment operates in the same way and can achieve same efficacy as the previous embodiment shown in FIG. 3A, so the details thereof are not redundantly repeated here.

Figure 6:
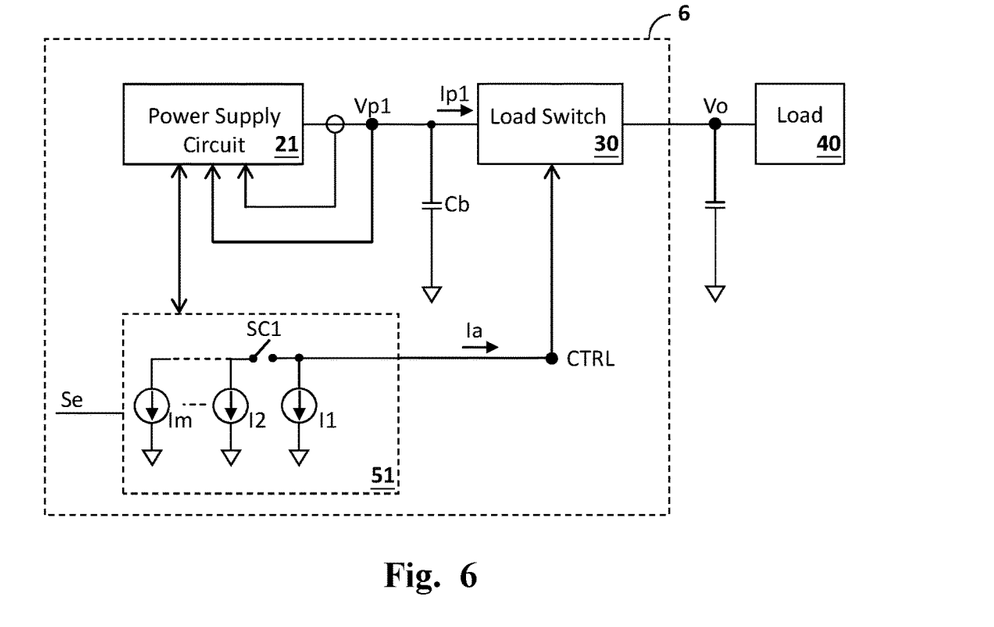
FIG. 6 shows a schematic diagram of a power conversion apparatus according to an embodiment of the present invention.

Please refer to FIG. 6, which shows a schematic diagram of a power conversion apparatus (i.e., power conversion apparatus 6) according to an embodiment of the present invention. In this embodiment, the control circuit 51 includes: plural current sources (i.e., current sources I1 to Im, wherein m is an integer greater than one) and at least one switch SC1. The switch SC1 is configured to operably control the current sources I1 to Im, so that the switching control signal CTRL has plural waveform segments during the soft-start period. In one specific embodiment, the control circuit 51 includes: a current source I1, a current source I2 and a switch SC1. The switch SC1 is configured to operably control the current sources I1 and I2, so that the switching control signal CTRL has plural waveform segments during the soft-start period.

It is noteworthy that, in one embodiment, an absolute value of a slope of the waveform of the switching control signal CTRL is positively correlated to a level of a current Ia generated from the control circuit 51; a higher level of the current Ia results in a higher absolute value of the slope of the waveform of the switching control signal CTRL (i.e., a higher level variation rate of the waveform). Please refer to FIG. 6 in conjugation with FIG. 3B. More specifically, in an embodiment wherein the plural waveform segments consist of two waveforms, during the period T1, the switch SC1 is ON, so that the current Ia is equal to (I1+I2) while during the period T2, the switch SC1 is OFF, so that the current Ia is equal to Ia=I1. In this embodiment, through controlling the switch SC1, the level of the current Ia during the period T1 is higher than the level of the current Ia during the period T2, whereby the absolute value of the slope of the first waveform segment is higher than the absolute value of the slope of the second waveform segment.

Figure 7:
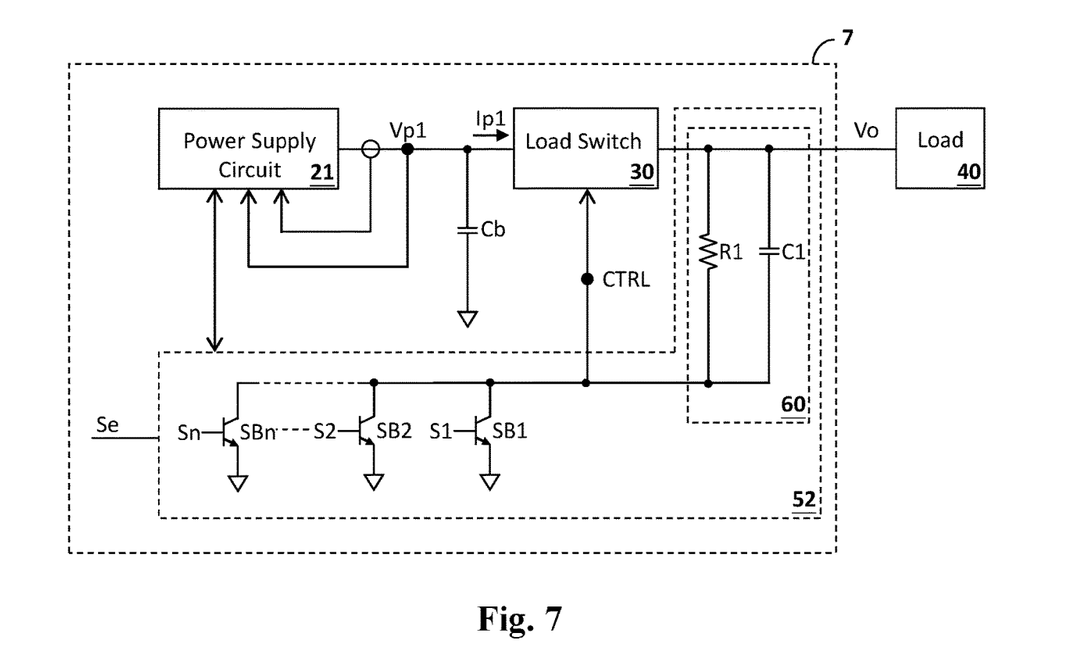
FIG. 7 shows a schematic diagram of a power conversion apparatus according to an embodiment of the present invention.

Please refer to FIG. 7, which shows a schematic diagram of a power conversion apparatus (i.e., power conversion apparatus 7) according to an embodiment of the present invention. In this embodiment, the control circuit 52 includes: a first capacitor C1, a first resistor R1 and plural switches (i.e., switches SB1, SB2, . . . to SBn, wherein n is an integer greater than one). In one embodiment, the first resistor R1 is coupled to the first capacitor C1, wherein the first resistor R1 and the first capacitor C1 form a first filter path 60. In one specific embodiment, the switches SB1 to SBn can be BJT transistors. In one embodiment, the switches SB1 to SBn are coupled between the first filter path 60 and a voltage source having a second level (e.g., low level). Each switch SB1 to SBn generates the switching control signal CTRL according to a corresponding upstream control signal (i.e., upstream control signals S1, S2, . . . to Sn), so that the switching control signal CTRL has plural waveform segments during the soft-start period. The upstream control signals S1 to Sn are generated according to the enable signal Se.

More specifically, in one embodiment, when more of the switches in the switches SB1 to SBn are ON, an absolute value of a slope of the waveform of the switching control signal CTRL is higher (i.e., the level variation rate of the waveform is higher). Thus, through controlling the switches SB1 to SBn, the switching control signal CTRL can have plural waveform segments having different slopes during the soft-start period. Besides, through controlling the switches SB1 to SBn, an absolute value of a slope of the first waveform segment in the plural waveform segments can be higher than an absolute value of a slope of the second waveform segment in the plural waveform segments.

Figure 8A:
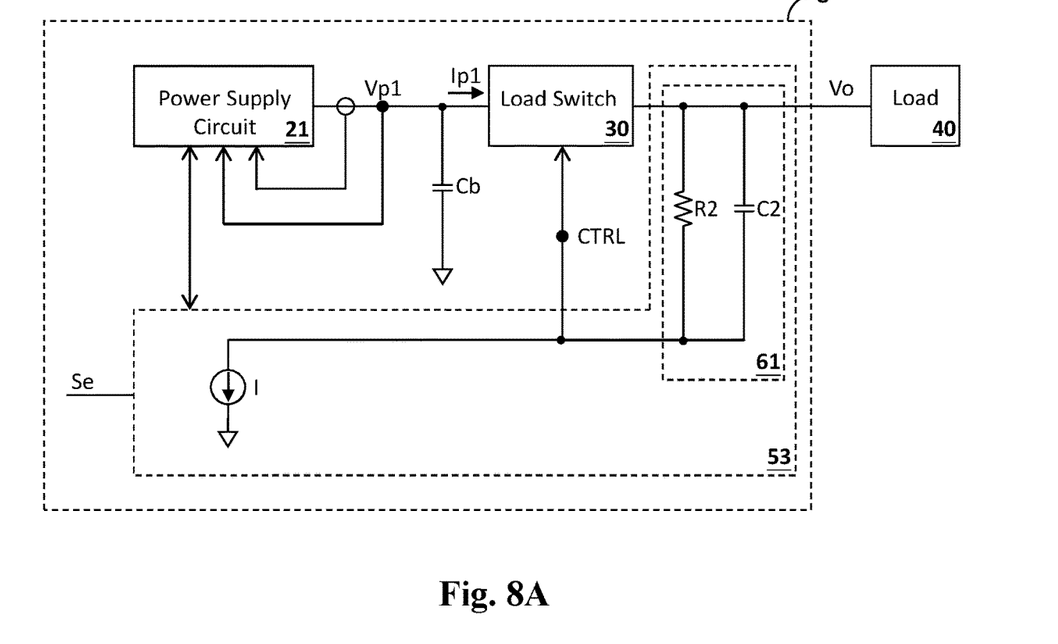
FIG. 8A shows a schematic diagram of a power conversion apparatus according to an embodiment of the present invention.
Figure 8B:
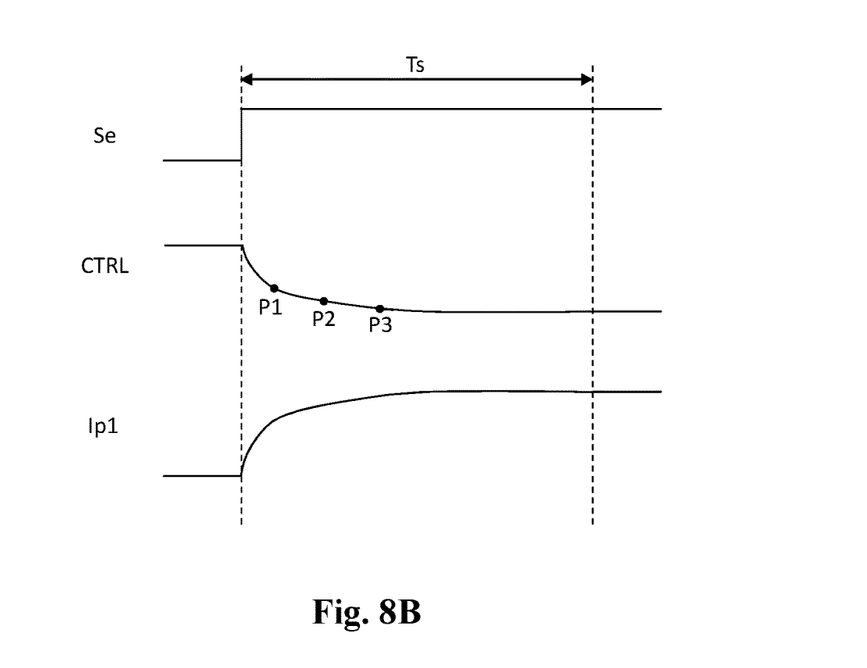
FIG. 8B shows operational waveforms in the power conversion apparatus of FIG. 8A.

Please refer to FIG. 8A along with FIG. 8B. FIG. 8A shows a schematic diagram of a power conversion apparatus (i.e., power conversion apparatus 8) according to an embodiment of the present invention. FIG. 8B shows operational waveforms corresponding to the power conversion apparatus of FIG. 8A. In this embodiment, as shown in FIG. 8A, the control circuit 53 includes: a second capacitor C2, a second resistor R2 and a current source I. In one embodiment, the second resistor R2 is coupled to the second capacitor C2, wherein the second resistor R2 and the second capacitor C2 form a second filter path 61. In one embodiment, the current source I is coupled between the second filter path 61 and the voltage source having the second level (e.g., low level), and the current source I generates the switching control signal CTRL according to the enable signal Se, so that the switching control signal CTRL has plural waveform segments during the soft-start period. In this embodiment, as shown in FIG. 8B, the plural waveform segments of the switching control signal CTRL form a continuous waveform (without sharp edge point). Correspondingly, the current Ip1 flowing through the load switch 30 has a continuous waveform. In one embodiment, as shown in FIG. 8B, in the continuous waveform, by performing differentiation upon each point on the waveform to obtain an absolute value of a slope of each point on the waveform, the obtained absolute value gradually decreases. For example, as shown in FIG. 8B, for the points P1-P3, the absolute value of the slope of the point P1 is larger than the absolute value of the slope of the point P2, and the absolute value of the slope of the point P2 is larger than the absolute value of the slope of the point P3. Correspondingly, the level variation rate of the waveform of the switching control signal CTRL changes from high to low.

Note that, in the plural waveform segments of the switching control signal CTRL, the level variation rate of each waveform segment can be a constant (e.g., as shown by the embodiment and operation waveform shown in FIG. 3A and FIG. 3B), or a variable which is selectable, adjustable or adaptively automatically adjustable (corresponding embodiments will be explained below).

Figure 9:
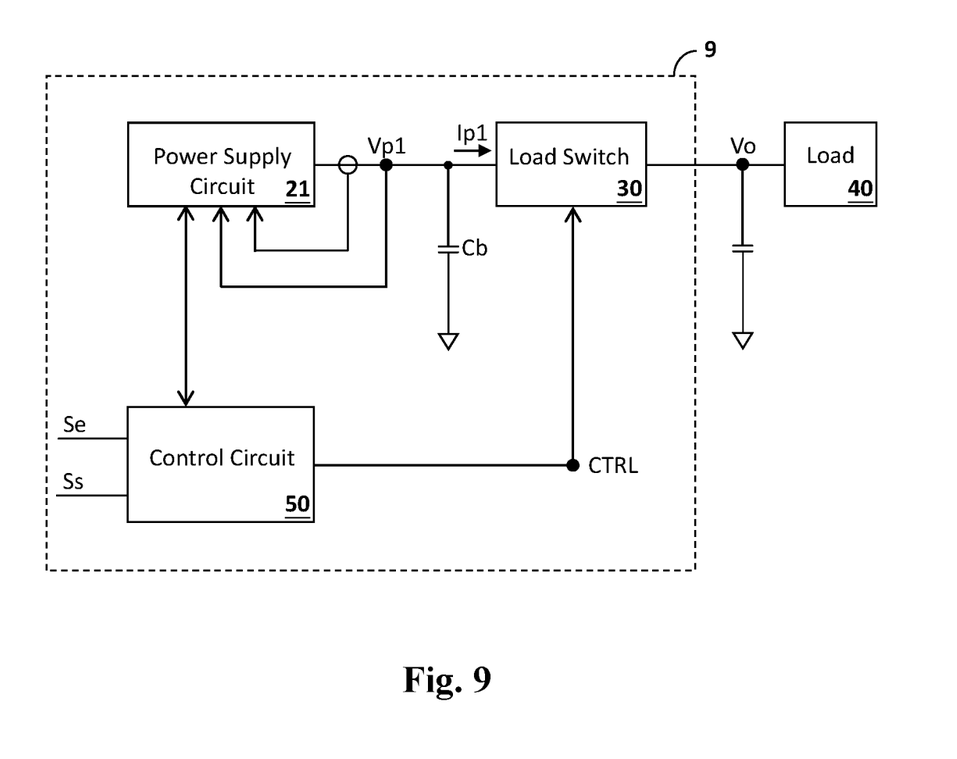
FIG. 9 shows a schematic diagram of a power conversion apparatus according to an embodiment of the present invention.

Please refer to FIG. 9, which shows a schematic diagram of a power conversion apparatus (i.e., power conversion apparatus 9) according to an embodiment of the present invention. In this embodiment, the control circuit 50 is configured to operably generate the switching control signal CTRL further according to a selection signal Ss. The selection signal Ss is configured to operably determine whether the level variation rate of each waveform segment is adaptively automatically adjustable. In other words, a user can predetermine the selection signal Ss, or generate the selection signal Ss according to other parameters, so as to determine whether to execute or not execute the adaptive automatic adjustment upon the level variation rate of each waveform segment.

Figure 10:
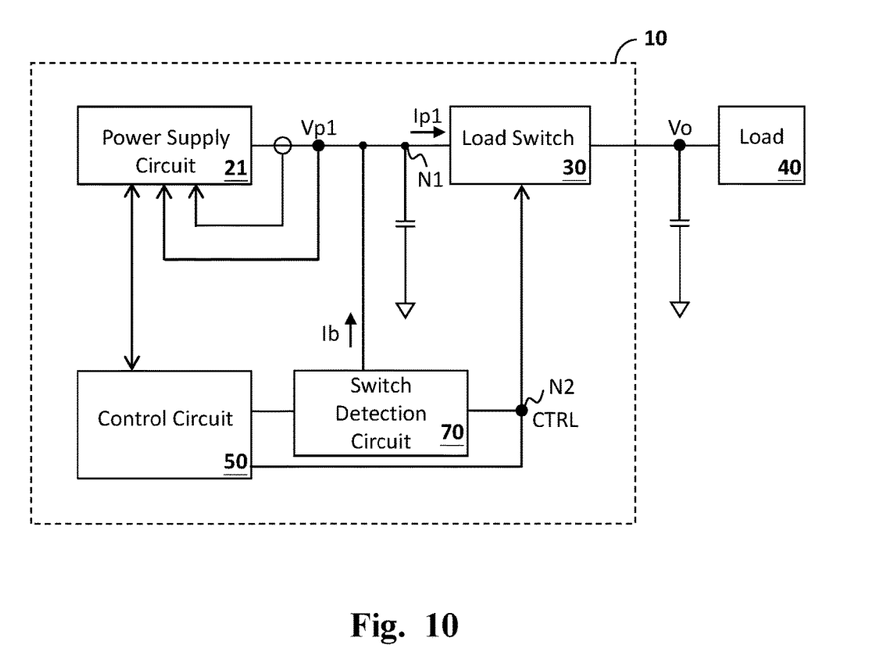
FIG. 10 shows a schematic diagram of a power conversion apparatus according to an embodiment of the present invention.

Please refer to FIG. 10, which shows a schematic diagram of a power conversion apparatus (i.e., power conversion apparatus 10) according to an embodiment of the present invention. In this embodiment, the power conversion apparatus 10 further comprises: a switch detection circuit 70. In one embodiment, the switch detection circuit 70 is coupled between the load switch 30 and the control circuit 50. The switch detection circuit 70 is configured to operably detect a characteristic parameter of the load switch 30. In one embodiment, the characteristic parameter of the load switch 30 is related to a parasitic capacitance of the load switch 30 (to be more specific, when the load switch 30 is implemented as a PMOS transistor, the parasitic capacitance of the load switch 30 is a parasitic capacitance between the gate and the source of the PMOS transistor). More specifically, as shown in FIG. 10, in one embodiment, the switch detection circuit 70 is configured to operably generate a current Ib to measure a voltage difference between a node N1 and a node N2, so as to obtain the characteristic parameter of the load switch 30. In one embodiment, the control circuit 50 adjusts the switching control signal CTRL according to the characteristic parameter of the load switch 30, so that in the plural waveform segments of the switching control signal CTRL, the level variation rate of each waveform segment can be adaptively automatically adjusted according to the characteristic parameter of the load switch 30.

Figure 11:
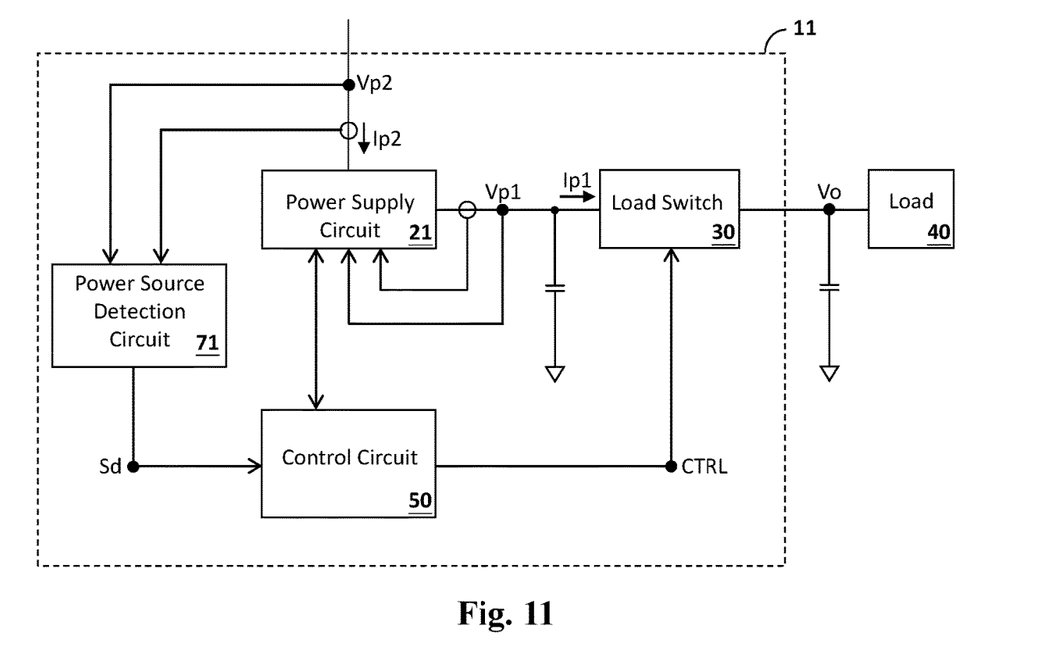
FIG. 11 shows a schematic diagram of a power conversion apparatus according to an embodiment of the present invention.

Please refer to FIG. 11, which shows a schematic diagram of a power conversion apparatus (i.e., power conversion apparatus 11) according to an embodiment of the present invention. In this embodiment, the power supply circuit 21 is further configured to operably convert a second power to the first power. The second power includes a voltage Vp2 and a current Ip2. In one embodiment, the power conversion apparatus 11 further comprises a power detection circuit 71, which is coupled between the second power and the control circuit 50. The power detection circuit 71 is configured to operably detect the voltage Vp2 and the current Ip2 of the second power, to generate a detection signal Sd. In one embodiment, the control circuit 50 adjusts the switching control signal CTRL according to the detection signal Sd, so that in the plural waveform segments of the switching control signal CTRL, whether the level variation rate of each waveform segment is adaptively automatically adjusted is determined according to the detection signal Sd, thereby preventing the voltage Vp2 of the second power from reaching a voltage threshold or preventing the current Ip2 of the second power from reaching a current threshold (in one embodiment, preventing the voltage Vp2 of the second power from being too low or preventing the current Ip2 of the second power from being too high).

In light of the above, during the soft-start period, the present invention can control the load switch by a switching control signal having plural waveform segments, wherein an absolute value of a slope of an earlier waveform segment in the plural waveform segments is relatively higher than that of a later waveform segment, whereby it takes a shorter time for the present invention to reach the OCP level. As a result, because the ON period of the load switch is accordingly shorter, the safety operation area becomes broader, so that when an over-current protection test is performed on the load switch of the present invention, the load switch is less likely to be damaged. Another advantage is that, under the over-current protection test, the power conversion apparatus of the present invention can employ a load switch or other devices which do not comply with a predefined specification, while still keeping the load switch or other devices to operate within the safety operation area without being damaged.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion apparatus, which is configured to operably generate an output power which is configured to be supplied to a load; the power conversion apparatus comprising:
a power supply circuit, which is configured to operably generate a first power;
a load switch coupled between the first power and the output power, the load switch being configured to operably control a power path from the power supply circuit to the load, wherein a first current of the first power flows through the load switch; and
a control circuit, which is configured to operably generate a switching control signal according to an enable signal, to control a conduction level of the load switch, wherein the conduction level of the load switch determines a level of the first current, wherein a level of the switching control signal is controlled to soft start from a first level to a second level, wherein when the level of the switching control signal is the first level, the load switch is controlled to be OFF, and when the level of the switching control signal is the second level, the load switch is controlled to be ON; wherein a soft-start period is defined as a period in which the switching control signal transits from the first level to the second level, and wherein during the soft-start period, the conduction level of the load switch is gradually increased;
wherein during the soft-start period, the switching control signal has a plurality of waveform segments, wherein the plurality of waveform segments include a first waveform segment and a second waveform segment, wherein a level variation rate of the first waveform segment is higher than a level variation rate of the second waveform segment, wherein the level variation rate is defined as an absolute value of a slope of the corresponding waveform segment, and wherein the first waveform segment precedes the second waveform segment;
wherein when the current of the first power exceeds an over-current threshold, the control circuit controls the load switch to be OFF;
wherein the control circuit is configured as one of the following:
(1) the control circuit including:
a plurality of current sources; and
at least one switch, which is configured to operably control the plurality of current sources, so that the switching control signal has the plurality of waveform segments during the soft-start period;
(2) the control circuit including:
a first capacitor;
a first resistor coupled to the first capacitor, wherein the first resistor and the first capacitor form a first filter path; and
a plurality of switches coupled between the first filter path and a voltage source having the second level, wherein each switch generates the switching control signal according to a corresponding upstream control signal, so that the switching control signal has the plurality of waveform segments during the soft-start period, wherein the corresponding upstream control signal is generated according to the enable signal; or
(3) the control circuit including:
a second capacitor;
a second resistor coupled to the second capacitor, wherein the second resistor and the second capacitor form a second filter path; and
a current source coupled between the second filter path and a voltage source having the second level, wherein the current source generates the switching control signal according to the enable signal, so that the switching control signal has the plurality of waveform segments during the soft-start period.

2. The power conversion apparatus of claim 1, wherein the load switch and the control circuit are located in different integrated circuits.

3. The power conversion apparatus of claim 1, wherein the load switch is a PMOS transistor.

4. The power conversion apparatus of claim 1, wherein the control circuit is configured as (3), and the plurality of waveform segments form a continuous waveform.

5. The power conversion apparatus of claim 1, wherein in the plurality of waveform segments, a level variation rate of each waveform segment is a constant or a variable which is selectable, adjustable or adaptively automatically adjustable.

6. The power conversion apparatus of claim 1, wherein the control circuit is configured to operably generate the switching control signal further according to a selection signal, wherein the selection signal is configured to operably determine whether the level variation rate of each waveform segment is adaptively automatically adjustable.

7. The power conversion apparatus of claim 5, further comprising:
a switch detection circuit coupled between the load switch and the control circuit, the switch detection circuit being configured to operably detect a characteristic parameter of the load switch;
wherein when the level variation rate of each waveform segment is adaptively automatically adjustable, the control circuit adjusts the switching control signal according to the characteristic parameter, so that in the plurality of waveform segments of the switching control signal, the level variation rate of each waveform segment is adaptively automatically adjusted according to the characteristic parameter.

8. The power conversion apparatus of claim 7, wherein the characteristic parameter is related to a parasitic capacitance of the load switch.

9. The power conversion apparatus of claim 5, wherein the power supply circuit is further configured to operably convert a second power to the first power, wherein the power conversion apparatus further comprises a power detection circuit, which is coupled between the second power and the control circuit, wherein the power detection circuit is configured to operably detect a voltage and a current of the second power, to generate a detection signal;
wherein when the level variation rate of each waveform segment is adaptively automatically adjustable, the control circuit adjusts the switching control signal according to the detection signal, so that in the plurality of waveform segments of the switching control signal, the level variation rate of each waveform segment is adaptively automatically adjusted according to the detection signal.

10. A control circuit, which is configured to operably generate a switching control signal according to an enable signal, to control a conduction level of a load switch so as to control a power supply circuit to generate a first power for supplying power to a load, wherein the conduction level of the load switch determines a level of a first current of the first power which flows through the load switch, wherein a level of the switching control signal is controlled to soft start from a first level to a second level, wherein when the level of the switching control signal is the first level, the load switch is controlled to be OFF, and wherein when the level of the switching control signal is the second level, the load switch is controlled to be ON, wherein a soft-start period is defined as a period in which the switching control signal transits from the first level to the second level, and wherein during the soft-start period, the conduction level of the load switch is gradually increased; the control circuit comprising one of the following configurations:

(1) the control circuit comprising:
a plurality of current sources; and
at least one switch, which is configured to operably control the plurality of current sources, so that the switching control signal has a plurality of waveform segments during the soft-start period;

(2) the control circuit comprising:
a first capacitor;
a first resistor coupled to the first capacitor, wherein the first resistor and the first capacitor form a first filter path; and
a plurality of switches coupled between the first filter path and a voltage source having the second level, wherein each switch generates the switching control signal according to a corresponding upstream control signal, so that the switching control signal has a plurality of waveform segments during the soft-start period, wherein the corresponding upstream control signal is generated according to the enable signal;

(3) the control circuit comprising:
a second capacitor;
a second resistor coupled to the second capacitor, wherein the second resistor and the second capacitor form a second filter path; and
a current source coupled between the second filter path and a voltage source having the second level, wherein the current source generates the switching control signal according to the enable signal, so that the switching control signal has a plurality of waveform segments during the soft-start period;

wherein during the soft-start period, the switching control signal has the plurality of waveform segments, wherein the plurality of waveform segments includes a first waveform segment and a second waveform segment, wherein a level variation rate of the first waveform segment is higher than a level variation rate of the second waveform segment, wherein the level variation rate is defined as an absolute value of a slope of the corresponding waveform segment, and wherein the first waveform segment precedes the second waveform segment;

wherein when a current of the first power exceeds an over-current threshold, the control circuit controls the load switch to be OFF.

11. The control circuit of claim 10, wherein the control circuit is configured as (3), and the plurality of waveform segments form a continuous waveform.

12. The control circuit of claim 10, wherein in the plurality of waveform segments, a level variation rate of each waveform segment is a constant or a variable which is selectable, adjustable or adaptively automatically adjustable.

13. The control circuit of claim 10, wherein the control circuit is configured to operably generate the switching control signal further according to a selection signal, wherein the selection signal is configured to operably determine whether the level variation rate of each waveform segment is adaptively automatically adjustable.

14. A control method for controlling a power conversion apparatus, the control method being configured to control a conduction level of a load switch of the power conversion apparatus, so as to control a power supply circuit of the power conversion apparatus to generate a first power for supplying power to a load, wherein the conduction level of the load switch determines a level of a first current of the first power which flows through the load switch; the control method comprising:

generating a switching control signal according to an enable signal and a selection signal; and
controlling a level of the switching control signal, to soft start from a first level to a second level, wherein a soft-start period is defined as a period in which the switching control signal transits from the first level to the second level;

wherein:
when the level of the switching control signal is the first level, controlling the load switch to be OFF;
when the level of the switching control signal is the second level, controlling the load switch to be ON;
when the switching control signal transits from the first level to the second level, gradually increasing the conduction level of the load switch;
wherein during the soft-start period, the switching control signal has a plurality of waveform segments, wherein the plurality of waveform segments includes a first waveform segment and a second waveform segment, wherein a level variation rate of the first waveform segment is higher than a level variation rate of the second waveform segment, wherein the level variation rate is defined as an absolute value of a slope of the corresponding waveform segment, and wherein the first waveform segment precedes the second waveform segment;
wherein when a current of the first power exceeds an over-current threshold, the control circuit controls the load switch to be OFF;
wherein the selection signal is configured to operably determine whether the level variation rate of each waveform segment is adaptively automatically adjustable.

15. The control method of claim 14, wherein in the plurality of waveform segments, a level variation rate of each waveform segment is a constant or a variable which is selectable, adjustable or adaptively automatically adjustable.

* * * * *